Figure 1:
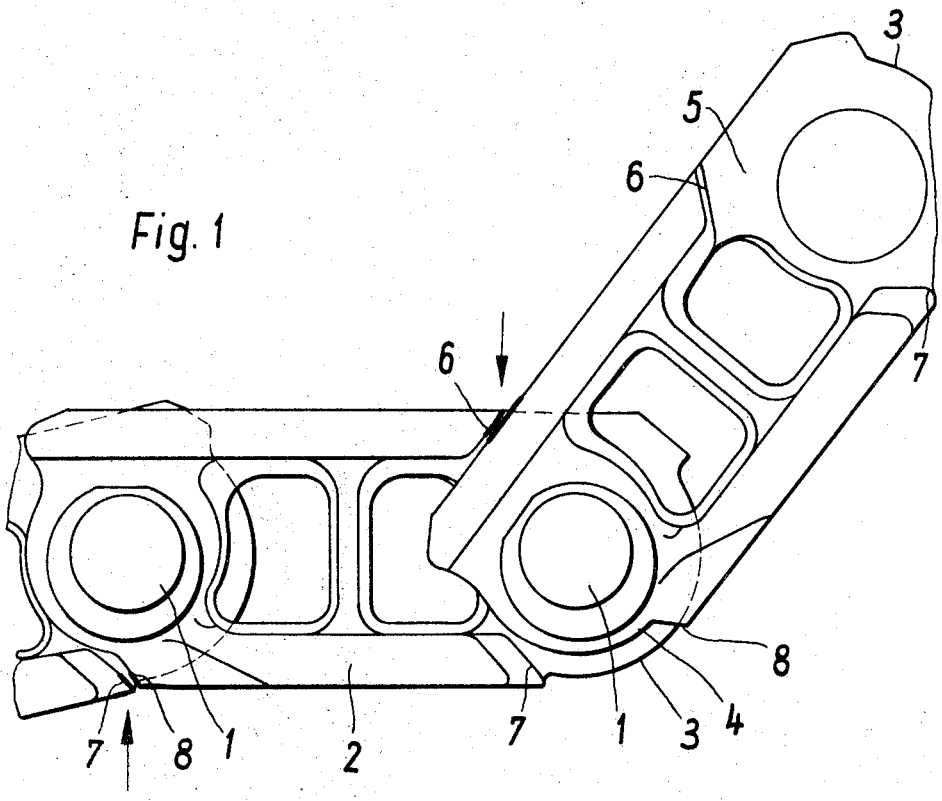
Figure 2:
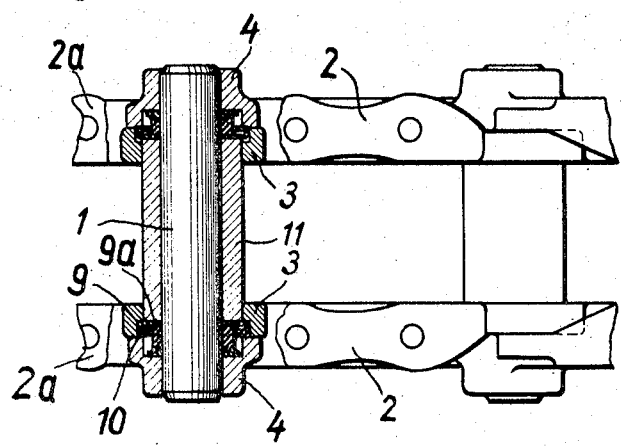

United States Patent

[11] 3,563,613

| [72] | Inventors | Horst Schulz<br>Stossdorf;<br>Wilhelm Jansen, Bensberg-Refrath,<br>Germany |
|---|---|---|
| [21] | Appl. No. | 827,085 |
| [22] | Filed | May 12, 1969 |
| [45] | Patented | Feb. 16, 1971 |
| [73] | Assignee | Klockner-Humboldt-Deutz<br>Aktiengesellschaft<br>Cologne, Germany |
| [32] | Priority | Mar. 24, 1966 |
| [33] | | Germany |
| [31] | | P 15 05 862.5 |
| | | Continuation of application Ser. No.<br>625,150, Mar. 22, 1967, now abandoned |

[54] ENDLESS TRACK WITH SEALED BEARING FOR THE JOINTS
2 Claims, 2 Drawing Figs.

[52] U.S. Cl. .................................................. 305/11;
305/42; 304/47
[51] Int. Cl. .................................................. B62d 55/22
[50] Field of Search ........................................... 305/11, 58,
59, 42, 47

[56] References Cited
UNITED STATES PATENTS

| 2,391,907 | 1/1946 | Knox (1) | 305/42 |
| 2,393,325 | 1/1946 | Knox (2) | 305/58 |
| 3,218,107 | 11/1965 | Reinsma | 305/11 |
| 3,341,259 | 9/1967 | Schulz | 305/11 |

FOREIGN PATENTS

| 645,415 | 11/1950 | Great Britain |
| 46,591 | 4/1963 | Poland |

*Primary Examiner*—Richard J. Johnson
*Attorney*—Walter Becker

ABSTRACT: The present invention concerns an endless track in which the track links are pivotally interconnected and in which the pivot means for pivotally interconnecting the track links have associated therewith, elastic sealing means which permits a limited angular movement only of adjacent links, while the sidewalls of the links are provided with abutment means for positively limiting said limited angular movement of adjacent links.

3,563,613

ENDLESS TRACK WITH SEALED BEARING FOR THE JOINTS

This is a continuation of Ser. No. 625,150 filed Mar. 22, 1967, now abandoned.

The present invention relates to an endless track with a seal for the bearing for the joints, which will permit only a limited angular movement of the chain links.

With endless tracks of the above-mentioned type, the seals of the bearings of the links between two adjacent link sidewalls and the rings rotatably connected thereto consist of elastic material adapted to absorb the relative angular movement of the track links. The seals of such endless tracks thus have no wearing away sliding surfaces and, therefore, are highly satisfactory with regard to a good sealing effect and a long life of the track.

Chain links of this type, however, have the drawback that the elastic rings of the seals are able only to permit a limited angular movement of the links. If this angle is exceeded, the seal may be destroyed. Therefore, when transporting and stocking such endless tracks, expensive precautionary measures have to be taken inasmuch as the track has to be wound onto roller-shaped devices in order to be sure that the link walls do not exceed the admissible angle. Such devices, however, do not protect an endless track of the above-mentioned type during the assembly thereof onto the drive assembly of a vehicle against undue high angular movements.

It is, therefore, an object of the present invention to provide an endless track which will overcome the above-mentioned drawbacks.

It is another object of this invention to provide an endless track which will by simple means automatically prevent the seal of the bearings for the links, which seal absorbs a limited angular movement, from exceeding said angular movement when transporting the track as well as when assembling the same on a drive assembly.

These and other objects and advantages of the invention will appear more clearly from the following specification in connection with the accompanying drawing illustrating in side view a portion of an endless track according to the present invention.

The objects set forth above have been solved according to the present invention by providing the sidewalls of the track links with abutment means limiting the angular movement of the track links to a desired permissible extent. According to a further development of the present invention, the said abutment means are formed by recesses in the sidewalls of the links. Such a design brings about the advantage that no additional weight is added to the track.

In order to limit the required angular movement of the track links to a minimum, the present invention provides that when the track is in its straightened out position, the angular deviation with regard to the rolling plane is limited by the abutments to the angular deviation necessary to meet the unevenness of the terrain.

Referring now more specifically to the drawing, the endless track comprises pairs of link sidewalls 2 which are interconnected by means of track bolts 1 and by an interposed chain bushing 11. The link sidewalls 2 have their ends provided with an inner bearing eye 3 and an outer bearing eye 4 while between the respective adjacent inner and outer bearing eyes 3, 4 there is inserted an axial seal which may be inserted in cylindrical recesses. The axial seal preferably consists of a ring of elastic material, the end faces of which are rotatably fixedly connected to the inner and outer bearing eye 3, 4 of the link sidewalls 2 so that the seal of the bearing eyes with regard to each other and thereby of the chain link bearing means is effected by the elastic ring. This ring, however, is able to absorb a limited turning movement only, and beyond said turning movement it will be damaged or destroyed. In order to prevent any undue angular movement of said rings, the link sidewalls 2 are, in conformity with the present invention, adjacent their inner bearing eyes 3 provided with abutments 6, 7 which are formed by recesses 5 and preferably extend at an inclination with regard to the axis of the link sidewalls. The abutment 7 which is adjacent the tread surface and which faces the rolling plane cooperates with an abutment 8 on the outer bearing eye 4, whereas the abutment 6 facing away from the rolling plane directly cooperates with the inner edge of the link sidewalls 2. The design of the link sidewalls 2 and the abutments 6, 7 thereof is so selected that when the chain is straightened out in one plane, viewed from this plane, a relative angular movement over an angle within the range of from +50 to −10° will be possible. The track links will thus be able to move through the larger angle occurring during the unrolling operation, and also to move through the smaller negative angle when moving over uneven terrain.

It is, of course, to be understood that the present invention is, by no means, limited to the particular construction shown in the drawing but also comprises any modifications within the scope of the appended claims.

It is also to be understood that the elastic sealing ring means for sealing the link bearings may be of any standard design and any standard elastic material, as for instance, rubber.

We claim:

1. An endless track formed by a plurality of interconnected track links having outer tread supporting surfaces and inner wheel engaging surfaces, each link comprising a pair of sidewalls with bearing eyes in opposite ends, each sidewall overlapping the sidewall of an adjoining link at each end, the ends of said overlapping sidewalls of each two adjoining links being laterally recessed so that the recessed end of each link fits within the recess of the adjoining link, said recessed interfitting ends having aligned openings with pivoted connecting means extending through the opposite sidewalls and through said openings in the links of each pair of adjoining links, elastic sealing means surrounding said pivot means between the eyes of each two adjoining sidewalls with its ends having sealing engagement with said sidewalls, the recessed portions of each two adjoining sidewalls having two pairs of opposed interengaging abutments on opposite sides of the pivoted connecting means to limit angular movement in opposite directions, one pair of abutments being adjacent the wheel engaging surfaces of said sidewalls and comprising the cut away end of the recess of one sidewall and the end of the wheel engaging surface of the adjoining sidewall, and the other pair of abutments being adjacent the tread supporting surfaces of said sidewalls and comprising the cut away end of the recess of one sidewall, and the end of the adjoining sidewall, the first-mentioned pair of abutments limiting relative angular movement of said links beyond the angular movement in passing over a sprocket wheel and the second-mentioned pairs of abutments limiting angular movement along the ground engaging stretch to provide a rigid ground engaging supporting stretch.

2. An endless track formed by a plurality of interconnected track links having sidewalls with outer tread supporting surfaces and inner wheel engaging surfaces, the sidewalls of each pair of interconnected links comprising overlapping ends formed with bearing eyes, pivot pin means through said eyes interconnecting said links, elastic sealing means surrounding said pivot pin means and extending between each pair of overlapping, opposed eyes with its ends fixed to the eyes of said interconnecting ends of the pair of links, said elastic means between said links providing relative angular movement of the ends of said links about said pivot pin means by torsional stress within its elastic limits when in use on a vehicle and being susceptible to damage when stressed beyond said elastic limits by excessive relative angular movement of said links, said links being relatively angularly movable in one direction to move about a sprocket wheel and in the opposite direction to form links of a rigid stretch of ground engaging track, each pair of said interconnected links having interengaging abutments to limit relative angular movement in said opposite direction to form said rigid stretch of ground engaging track, each pair of said interconnected links also having a second set of interengaging abutments to limit relative angular movement in said one direction greater than the angular movement to pass about the sprocket wheel when in use, said sidewalls of adjacent links having said interengaging abutments on opposite sides of said eyes with the one set limiting movement to form said stretch of ground engaging track adjacent the tread supporting surface and outwardly of said eyes, and the second set of abutments being inwardly of the eyes, and formed by a shoulder on a cut away wheel engaging surface of one link and the wheel engaging surface of the other link, said second set of interengaging abutments limiting the angular movement in said one direction to such an angle that the total extent of relative angular movement in opposite directions is less than the angular movement within the elastic limits of said elastic sealing means, so that said elastic sealing means cannot be damaged by excessive angular movement of said links when not in use on a vehicle.